Figure 1:
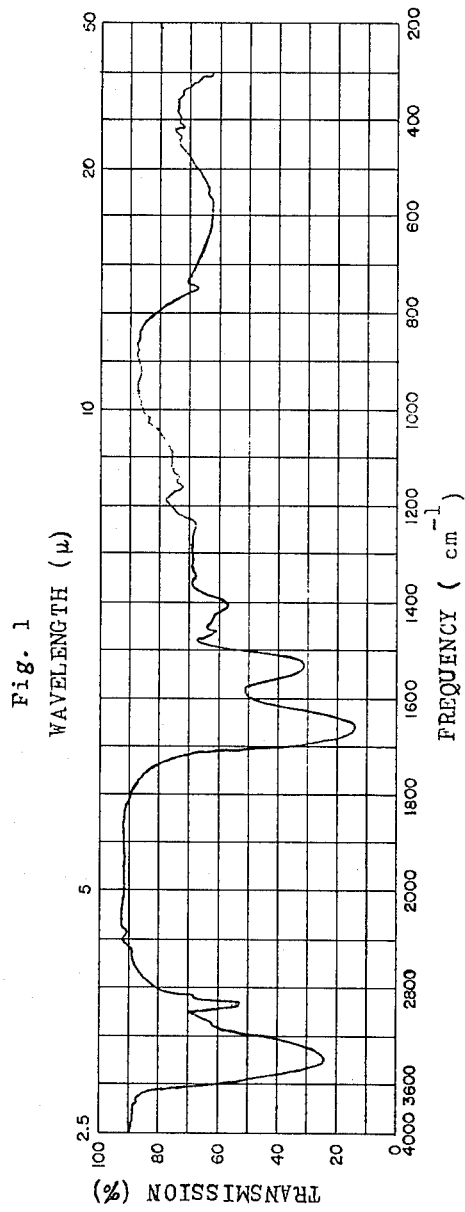

United States Patent [19]

Shoji et al.

[11] 3,923,979

[45] Dec. 2, 1975

[54] ANTIBIOTIC 60-6 AND PRODUCTION THEREOF

[75] Inventors: Jun'ichi Shoji, Hirakota; Mikao Mayama, Ikeda; Shinzo Matsuura, Itami; Kouichi Matsumoto, Toyonaka; Yoshiharu Wakisaka, Takarazuka, all of Japan

[73] Assignee: Shionogi & Company, Ltd., Japan

[22] Filed: Apr. 15, 1974

[21] Appl. No.: 461,433

[30] Foreign Application Priority Data

Apr. 25, 1973 Japan.............................. 48-47413

[52] U.S. Cl.................................. 424/118; 195/80
[51] Int. Cl.².......................................... A61K 35/00
[58] Field of Search....................... 424/118; 195/80

[56] References Cited

OTHER PUBLICATIONS

Miller, The Pfizer Handbook of Microbial Metabolites, McGraw Hill Book Co., Inc., New York, N.Y., 1961 pp. 488 and 489.

Primary Examiner—Jerome D. Goldberg
Attorney, Agent, or Firm—Wenderoth, Lind & Ponack

[57] ABSTRACT

A new antibiotic, 60-6, being useful as medicament and veterinary drug for inhibiting the growth of gram-positive pathogenic microorganism, and a process for preparing the same, being characterized by cultivating a 60-6-producing strain of microorganism belonging to the Genus Bacillus in an aqueous nutrient medium under aerobic conditions.

3 Claims, 1 Drawing Figure

60-6 (free base)

ANTIBIOTIC 60-6 AND PRODUCTION THEREOF

The present invention relates to a novel antibiotic, 60-6, and production thereof.

In particular, the invention relates to a novel antibiotic, 60-6, having antibacterial activity, and to a method for producing the antibiotic, 60-6, characterized by cultivating an antibiotic 60-6-producing strain of Bacillus in an aqueous nutrient medium under aerobic conditions and recovering 60-6 from the culture broth.

In the course of a search for new fermentation products, it has newly been discovered that a microorganism belonging to Bacillus cereus speciess indexed No. 60-6 in the collection of Shionogi Research Laboratory, Shionogi and Co., Ltd., Osaka, Japan, and on deposit with Fermentation Research Institute (a division of the agency of industrial science and technology, Japan) under the accession number FERM-P 1896 and with the American Type Culture Collection under the accession number ATCC 21929, produces a new antibiotic, 60-6, when cultivated in an aqueous nutrient medium under aerobic conditions. The present invention has been accomplished on the basis of this discovery. Accordingly, the principal object of the invention is to provide a new and useful antibiotic which is active against gram-positive pathogenic microorganisms. This and other objects which will be apparent to those conversant with the art to which the present invention pertains from the subsequent description, are achieved by the present invention.

*Bacillus cereus* No. 60-6 was isolated from a soil sample collected at New Guinia and shows the following taxonomic characteristics. The examination of the taxonomic characteristics was conducted according to the method described in "Manual of Microbiological Methods (1957) by the Society of American Bacteriologists (McGram-Hill Book Co., Inc., New York)".

I. Morphological characteristics (Nutrient agar slant, 30°C, 1-3 days).
   1. Form and arrangement: Rods, usually occurring in single or in chain.
   2. Motility: Not observed.
   3. Flagella: Peritrichous flagella.
   4. Size: Mainly 1.0–1.1 × 3–4$\mu$.
   5. Irregular form: Not observed.
   6. Sporangia: Not definitely swollen.
   7. Endospore: 1.0 to 1.5 $\mu$, oval. Thin-walled.
   8. Gram staining: positive.
   9. Acid fast staining: Negative.

II. Cultural characteristics
   A. Agar colonies (Nutrient agar plate, 30°C, 1-3 days).
      1. Form: Circular. The form turns to slightly rhizoid or filamentous with aging.
      2. Surface: Not shining.
      3. Edge: Erose to filamentous, but entire at very early growth.
      4. Elevation: Convex to raised.
      5. Consistency: Soft in early growth, but it becomes a little butyrous with aging.
      6. Optical density: Opaque.
   B. Agar stroke (Nutrient agar slant, 30°C, 1-7 days).
      1. Growth: Moderate, rapid growth.
      2. Form: Filiform to slightly arborescent.
      3. Chromogenesis of cell: Not chromogenic.
      4. Surface: Not shining (except in very early growth).
      5. Consistency: Soft, but it becomes a little butyrous with age.
      6. Optical density: Opaque.
   C. Liquid medium (Nutrient broth, 30°C, 1-14 days).
      1. Growth on surface: Ring, sometimes fragile pellicle.
      2. Growth in medium: Granular or cloud turbidity in upper layer at early period of growth. The sediments occur with aging.
   D. Gelatin stab (Gelatin-yeast extract medium, 28°C, 1 to 15 days).
      1. Growth: Good.
      2. Lequefaction: Liquefied in stratiform.
   E. Litmus milk (30°C, 1-7 days).
      1. Litmus reaction: Acid production is observed from 2 to 5 days stage. Reduction of litmus is observed at 6 days or later.
      2. Peptonization: Positive.
      3. Coagulation: Not observed.

III. Physiological characteristics.
   1. Oxygen requirements: Facultative anaerobic (Agar stab).
   2. Temperature for growth: Optimum growth temperature lies around 25°–30°C. The growth rate at 37°C is slower than that at 30°C. The growth does not occur at 63°C (Glucose nutrient medium).
   3. PH for growth: Optimum growth pH lies between 7 and 8. The growth does not occur below pH 5.
   4. Nitrate reduction: Nitrites are produced from nitrates, but $N_2$ gas is not produced from nitrates.
   5. O-F test: Weakly fermentative.
   6. Voges-Proskauer reaction: Positive.
   7. Indol formation: Negative.
   8. $H_2S$ formation: Negative.
   9. Hydrolysis of starch: Positive (strong).
   10. Utilization of citrate: No growth on Koser's medium. Slightly growth on Christensen's medium at over 10 days.
   11. Urease activity: Negative.
   12. Kovac's oxidase text: Negative. pl 13. Catalase activity: Positive.
   14. Utilization of carbohydrates (Nutrient medium containing 1 % of carbohydrate, 28°C, 1-6 days).

| Carbohydrate | Growth | Gas | Acid |
| --- | --- | --- | --- |
| L-Arabinose | + | − | − |
| D-Xylose | + | − | ± |
| D-Glucose | + | − | + |
| D-Mannose | + | − | − |
| D-Galactose | + | − | ± |
| D-Fructose | + | − | + |
| Sucrose | + | − | + |
| Maltose | + | − | + |
| Lactose | + | − | ± |
| Trehalose | + | − | + |
| Starch | + | − | + |
| Glycerol | + | − | + |
| Mannitol | + | − | − |
| Inositol | + | − | − |

+ : Good growth. Acid is produced.
− : Gas and acid are not produced.
± : Acid is slightly produced.

15. Resistance to NaCl (Yeast extract-nutrient medium at 30°C for 1-7 days): Growth in 3.3 per cent NaCl; No growth in 7.0 per cent NaCl.
   16. Methyleneblue reduction: Reduced.
   17. Tyrosinase activity: Negative.

From the above results, it is apparent that the strain should be classified as belonging to the Genus Bacillus.

Further, comparison of the morphological, cultural, and physiological characteristics among many species of Bacillus described in "Bergey's Manual of Determinative Bacteriology (seventh edition)" and other literature, shows that in most of its properties the said strain is very similar to *Bacillus cereus*. Therefore, it is concluded that the strain of the present invention is of the Bacillus cereus species, and the microorganism of the present invention has been designated *Bacillus cereus* No. 60-6.

It is to be understood that for the production of 60-6, the present invention is not limited to the use of *Bacillus cereus* No. 60-6. It is especially desired and intended to include the use of natural or artificial mutants produced from the described organism, or variants belonging to *Bacillus cereus* as far as they can produced the antibiotic, 60-6. The artificial production of mutants may be accomplished by a conventional operation such as X-ray or ultraviolet-ray irradiation, nitrosoguanidine, nitrogen, mustards, 4-nitro-quinoline N-oxide and other mutagens.

In the present invention, the new antibiotic, 60-6, is produced during cultivation of the microorganism, e.g. *Bacillus cereus* No. 60-6, in an aqueous nutrient medium at a temperature of about 20 to about 37°C, preferably 25° to 35°C, under aerobic conditions preferably submerged aerobic conditions. The composition of the nutrient medium may be varied over a very wide range. Essentially what is required is a carbon source, a nitrogen source, and trace inorganic elements. Examples of suitable carbon sources are glucose, sucrose, xylose, fructose, galactose, inositol, mannitol, glycerin, dextrin, starch, organic acids, molasses and the like. Suitable sources of nitrogen for the fermentation process include meat extract, peptone, soy bean meal, corn steep liquor, yeast extract, peanut meal, wheat gluten, cotton seed flour, rice bran, casamino acid (acid hydrolysate of casein), NZ amine (enzymatic hydrolysate of casein), ammonium sulfate, ammonium carbonate, ammonium chloride and the like. Examples of suitable sources of inorganic elements are mineral salts such as sodium chloride, potassium chloride, calcium carbonate, potassium phosphate and the like. The nutrient medium may or may not be adjusted to about pH 7.0–8.0 prior to inoculation of the microorganism. The pH tends to remain around the said level during the fermentation, but, if variations are encountered, a buffering agent such as calcium carbonate may be added to the medium to maintain the pH at about 7.0–8.0. In addition, if excessive foaming is encountered, anti-foaming agents such as vegetable oils, lard oil, and polypropyleneglycol may be added to the fermentation medium prior to or in the course of the fermentation. For a large scale of production, it is preferred to carry out the fermentation under submerged aerobic conditions. The maximum yields of the antibiotic, 60-6, can be attained within about 20 to about 100 hours, usually about 40 hours, of fermentation under optimum conditions of temperature and aeration.

After growth of the microorganism, the antibiotic, 60-6 can be recovered from the culture broth by a per se conventional manner. The cell may be separated from the fermentation broth using standard equipment such as filter-press and centrifuge, then antibiotic 60-6 may be recovered from the cell and the filtrate by a solvent extraction procedure. As antibiotic 60-6 is retained by the filtrate in appreciable quantities, a solvent extraction procedure is preferably used to recover the antibiotic from the filtrate, or from the whole broth without removal of the filtrate. Suitable extraction solvents include dimethyl sulfoxide, aqueous methanol, aqueous ethanol, aqueous butanol, aqueous acetone and the like. For extraction of the antibiotic from a large volume of broth, however, an adsorption procedure is superior to a direct solvent extraction procedure. For instance, the whole broth may be filtered after the addition of a filter aid, such as Hyflo Super Cel (diatomaceous earth), and the resulting cake of filter aid and cell may be treated with a suitable organic solvent such as dimethyl sulfoxide, aqueous methanol, aqueous ethanol, aqueous butanol, or aqueous acetone to extract the antibiotic. The extract may be concentrated and, if necessary, a suitable solvent may be added to precipitate the crude active component.

The thus obtained crude active component may be further purified, if desired, by suitable operations such as reprecipitation, chromatography and the like. For example, reprecipitation may be carried out be dissolving the crude material in an organic solvent such as a mixture consisting of chloroform, methanol, and water, concentrating, and then adding ethanol to the solution. The preferred chromatographic adsorbents are silica gel, silicic acid and the like.

Thus obtained 60-6 may, when required, be coverted into acid addition salts, ammonium salt, or metal salts suitable for pharmaceutical use, having low toxicity and desirable stability. Such a conversion can be effected in a conventional manner such as by treating the said 60-6 with an acid, ammonium chloride or hydroxide in an appropriate solvent. Examples of the pharmaceutically acceptable acid-addition salts are hydrochloride, hydrobromide, hydroiodide, sulfate, nitrate, phosphate, thiocyanate, oxalate, succinate, and naphthalenedisulfonate. Examples of the metal salt are sodium salt, potassium salt, calcium salt, magnesium salt, aluminum salt, iron salt and the like.

The physical and chemical properties of antibiotic 60-6 are as follows.

1. Elementary analysis: C, 53.91%, 54.33%; H, 7.72%, 7.61%; N, 14.27%, 14.76%. O, 23.68%, 23.72% (balance).
2. Molecular weight: about 1600 (estimated by amino acid analysis value). Neutralization equivalent: 1517
3. Melting point: The compound decomposes progressively at over 190°C.
4. Specific optical rotation: $[\alpha]_D^{23.0}$ + 19.5±3.5°( $c$= 0.172 %, in dimethylformamide).
5. Ultraviolet absorption spectrum: $\lambda_{max}^{MeOH}$ : 275 $\mu$ ($E_{1cm}^{1\%}$ 36), 282 $\mu$ ($E_{1\ cm}^{1\%}$ 38.5), 290.5 $\mu$ ($E_1{}^{1\%}$ cm 33.5).
6. Infrared absorption spectrum: $\nu_{max}^{KBr}$ $cm^{-1}$ : 3400, 3065, 1658, 1533, 1457, 1405. (See FIG. 1)
7. Solubility: Very soluble in dimethyl sulfoxide, dimethylformamide and dilute alkaline water. Slightly soluble in aqueous alcohols and aqueous acetone. Insoluble in ethyl acetate, chloroform, ether and petroleum ether.
8. Color reaction:
   Ninhydrin: positive
   Dragendorff: positive
9. Color and form of the compound: Colorless powder, amphoteric substance.
10. Acid hydrolysis: aspartic acid (3), threonine (1), serine (1), valine (2), alloisoleucine (1), tryprophane (1), $\gamma$-hydroxylysine (1), ammonia (2–3), (The numbers in parenthesis are presumptive malar number).

An acid hydrolysate of the compound (60-6) was extracted with ether, the ether extract was methylated, then the methylated fatty acid containing extract was analyzed by gas chromatography. As a result a variety of methyl esters of fatty acids containing 12–16 carbon atoms were detected.

11. Behavior on thin-layer chromatography.

| Carrier | Solvent | Rf value |
| --- | --- | --- |
| Silica gel | n-butanol-acetic acid-water (3:1:1 by volume) | 0.50 |
| Silica gel | chloroform-ethanol-14% aqueous ammonia (4:7:2 by volume) | 0.37 |
| Silica gel | chloroform-ethanol-water (4:7:2 by volume) | 0.50 |

The Detection of the compound developed on a silica gel plate was conducted by bioautography using *Staphylococcus aureus* 209P, ninhydrin reaction, and heat treatment of the plate sprayed by sulfuric acid.

The said chromatogram of 60-6 prepared as described in Example 1 shows a single spot in each of the said solvent systems.

On the basis of the above physical and chemical properties, antibiotic 60-6 is considered to be consisting of various new acylpeptides, each of which has the same peptide part of the molecule but is different in the acyl residue.

Antibiotic 60-6 shows activity against a variety of microorganisms. The in vitro antimicrobical activity of 60-6 was determined by the agar plate dilution method. The results are shown in Table 1.

Table 1.

| Test microorganism | Minimum inhibitory concentration (mcg/ml) |
| --- | --- |
| *Bacillus substilis* PCI 219 | 6.25 |
| *Bacillus anthracis* | 25 |
| *Staphylococcus aureus* 209 P | 50 |
| *Streptococcus pyogenes* C-203 | 6.25 |
| *Diplococcus pneumoniae* type I | 3.13 |
| *Escherichia coli* NIHJ JC-2 | >50 |
| *Klebsiella pneumoniae* | >50 |
| *Salmonella typhimurium* | >50 |
| *Pseudomonas aeruginosa* | >50 |

Medium: Modified Mueller Hinton agar medium (Nissam).

It is seen from Table 1 that the antibiotic 60-6 is active against gram-positive bacteria.

Acute toxicity studies on antibiotic 60-6 were carried out in mice, and the $LD_{50}$ value was found to be over 500 mg/Kg subcateneously. In addition, antibiotic, 60-6 is found to be highly active against *Staphylococcus aureus* type, *Diploccoccus pneumoniae* type or *Streptococcus pyogenes* type in a therapeutic experiment in mice with experimental infection.

The new antibiotic 60-6 and the salts thereof of the present invention are useful as a medicament and veterinary drug for inhibiting the growth of gram-positive pathogenic microorganism. It is also useful as a disinfectant.

The antibiotic 60-6 and the salts thereof, can be administered orally, subcutameously, intravenously or locally to human or animal in per se pharmaceutically conventional forms, e.g. injections, liquids, suspensions, emulsions, ointments or tablets with suitable carriers, stabilizers, emulsifiers, preservatives and/or wetting agents, where a therapeutically effective amount of the active ingredient is contained.

The following examples are given solely for the purpose of illustration and are not to be construed as limitations of the present invention, many variations of which are possible.

EXAMPLE 1

*Bacillus cereus* No. 60-6 (ATCC No. 21929) is inoculated to 130 ml of a nutrient medium (pH 7.0) composed of 1.0 % of glucose, 0.25 % of glycerin, 1.0 % of peptone, 0.5 % of meat extract, and 0.3 % of sodium chloride, contained in 500 ml shaking flask (Sakaguchi flask). The cultivation is performed at 28°C for 24 hours under shaking.

100 g of Hyflo Super Cel is added to about 5 liters of the cultured broth and filtered. The cell is extracted several times with 40 % aqueous solution of acetone and the extract solution is evaporated under reduced pressure to remove the majority of the acetone. The resulting solution is extracted with butanol. On the other hand, the filtrate is extracted with butanol. The butanol extract are combined, washed with water and concentrated under reduced pressure. Ethanol is then added to the concentrated solution, and the resulting precipitate formed in the solution is allowed to stand at 4°C and filtered. The obtained crude substance is dissolved in a mixture consisting of 3 volumes of chloroform, 6 volumes of methanol, and 2 volumes of water, and the solution is concentrated. Ethanol is again added to the concentrated solution.

Thus, the operation of reprecipitation is repeated to give the crude substance (about 1.2 g).

The crude substance (150 mg) is applied to a silica gel GF plate (thickness: 750 μ 100 × 20 cm) and developed with solvent consisting of chloroform-ethanol-14% aqueous ammonia (4 : 7 : 2 by volume). The part containing 60-6 on the silica gel plate is extracted with a solvent consisting of chloroform-methanol-aqueous ammonia. The extract solution is concentrated under reduced pressure then extracted with butanol. The butanol extract is washed with water and evaporated under reduced pressure to give a purified 60-6 (about 100 mg) (free form) as colorless powder.

What is claimed is:

1. An antibiotic, 60-6, effective in inhibiting the growth of gram-positive microorganism, the said antibiotic being colorless amphoteric powder which shows no definite melting point but progressively decomposes at over 190°C; contains the elements carbon, hydrogen, nitrogen and oxygen in substantially the following proportions by weight:

| Carbon | 53.91 %, | 54.33 % |
| Hydrogen | 7.72 %, | 7.61 % |
| Nitrogen | 14.27 %, | 14.76 %; | has an optical rotation of $[\alpha]_D^{23.0} + 19.5 \pm 3.5°$ (c=0.172 %, in dimethylformamide); has a molecular weight of 1600 and a neutralization equivalent of 1517; shows the formation of aspartic acid, threonine, serine, valine, alloisoleucine, tryptophane, γ-hydroxylysine, ammonia and a variety of fatty acids containing 12–16 carbon atoms on acid hydrolysis; and shows ultraviolet absorption (in methanol) at 275, 282 and 290.5 μ and an infrared absorption spectrum as in the attached drawing, FIG. 1.

2. The process for producing the antibiotic 60-6 as defined in claim 1, which comprises cultivating *Bacillus cereus* No. 60-6 (ATCC No. 21929) in an aqueous nutrient medium at a temperature from about 20° to 37°C for about 20 to about 100 hours under aerobic conditions, and isolating the accumulated antibiotic 60-6 from the cultured broth.

3. The process claimed in claim 2, wherein the isolation of the antibiotic 60-6 is carried out by filtering the cultured broth and extracting both the cells and the filtrate with a suitable solvent.

* * * * *